US010072745B1

(12) United States Patent
Dorsey

(10) Patent No.: US 10,072,745 B1
(45) Date of Patent: Sep. 11, 2018

(54) STRAIGHT LINE MECHANISM WITH ANTI-TIP FEATURES

(71) Applicant: ScanTech Instruments, Inc., Longview, TX (US)

(72) Inventor: Harvey Alan Dorsey, Longview, TX (US)

(73) Assignee: SCANTECH INSTRUMENTS, INC., Longview, TX (US)

( * ) Notice: Subject to any disclaimer, the term of this patent is extended or adjusted under 35 U.S.C. 154(b) by 137 days.

(21) Appl. No.: 15/333,181

(22) Filed: Oct. 24, 2016

Related U.S. Application Data

(60) Provisional application No. 62/245,983, filed on Oct. 23, 2015.

(51) Int. Cl.
| G01D 11/30 | (2006.01) |
| G01D 11/00 | (2006.01) |
| G01D 11/24 | (2006.01) |
| G01D 21/00 | (2006.01) |
| G01D 15/28 | (2006.01) |
| G01M 99/00 | (2011.01) |
| G01M 13/00 | (2006.01) |
| G01N 29/22 | (2006.01) |
| G01N 29/265 | (2006.01) |
| G01N 25/00 | (2006.01) |
| G01N 29/26 | (2006.01) |
| G01N 29/24 | (2006.01) |
| F16H 21/44 | (2006.01) |
| G01M 15/14 | (2006.01) |

(Continued)

(52) U.S. Cl.
CPC ............. *F16H 21/44* (2013.01); *G01D 11/30* (2013.01); *F16M 13/022* (2013.01)

(58) Field of Classification Search
CPC ...... G01D 11/30; G01D 11/245; G01D 11/00; G01D 11/24; G01D 21/00; G01D 15/28; G01D 5/24442; G01M 99/00; G01M 13/00; G01M 15/14; G01M 11/33; G01M 3/183; G01N 25/00; G01N 29/225; G01N 29/22; G01N 29/265; G01N 29/24; G01N 29/26
USPC .............................................. 73/866.5, 865.8
See application file for complete search history.

(56) References Cited

U.S. PATENT DOCUMENTS 6,969,385 B2 * 11/2005 Moreyra ................. A61B 34/71
606/1
8,460,175 B2 * 6/2013 Jo ....................... A61B 1/00149
600/102

(Continued)

*Primary Examiner* — Daniel S Larkin
*Assistant Examiner* — Anthony W Megna Fuentes
(74) *Attorney, Agent, or Firm* — Mark W Handley; Handley Law Firm, PLLC

(57) ABSTRACT

A straight line mechanism with anti-tip features is disclosed having a four bar linkage with two fixed rotation pins and two floating rotation pins. A link extends through the two floating pins and downward beneath the floating pins to define a swing arm. A yoke is mounted in cantilevered arrangement from a lower end of the swing arm by means of two spaced apart offset pins, with the mounting spacing thereof being more closely spaced and at a lower elevation at the swing arm than at the yoke. A probe is pivotally mounted in an end of the yoke disposed opposite of the swing arm, free to rotate in an angular direction about an X-axis disposed transverse to a direction of travel along a Y axis and constrained to travel along the Z-axis, which is preferably perpendicular to the Y-axis.

5 Claims, 9 Drawing Sheets

(51) Int. Cl.
*G01M 3/18* (2006.01)
*F16M 13/02* (2006.01)

(56) References Cited

U.S. PATENT DOCUMENTS

2003/0036748 A1* 2/2003 Cooper ............ A61B 17/00234
 606/1
2014/0366674 A1* 12/2014 Swartz ..................... B25J 18/00
 74/490.05

* cited by examiner

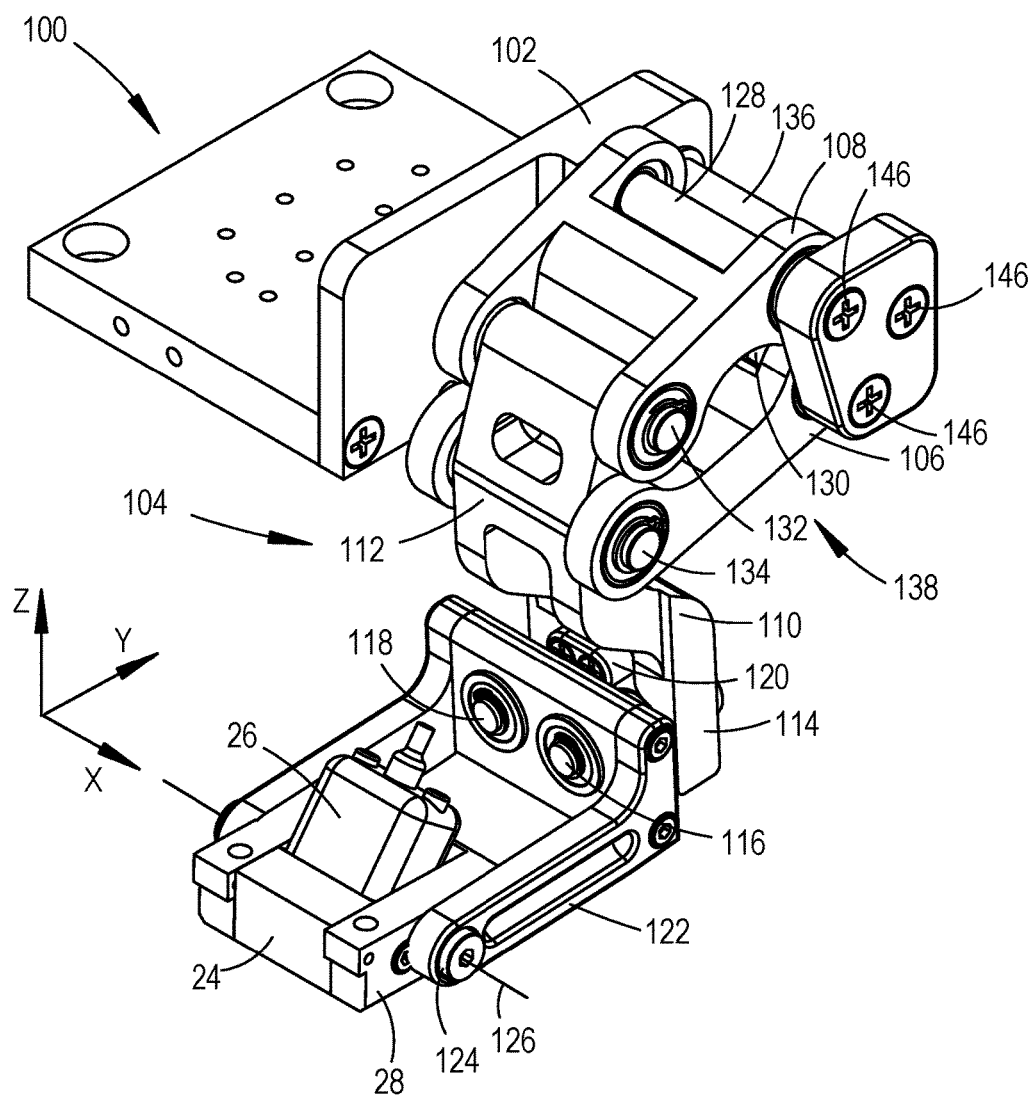

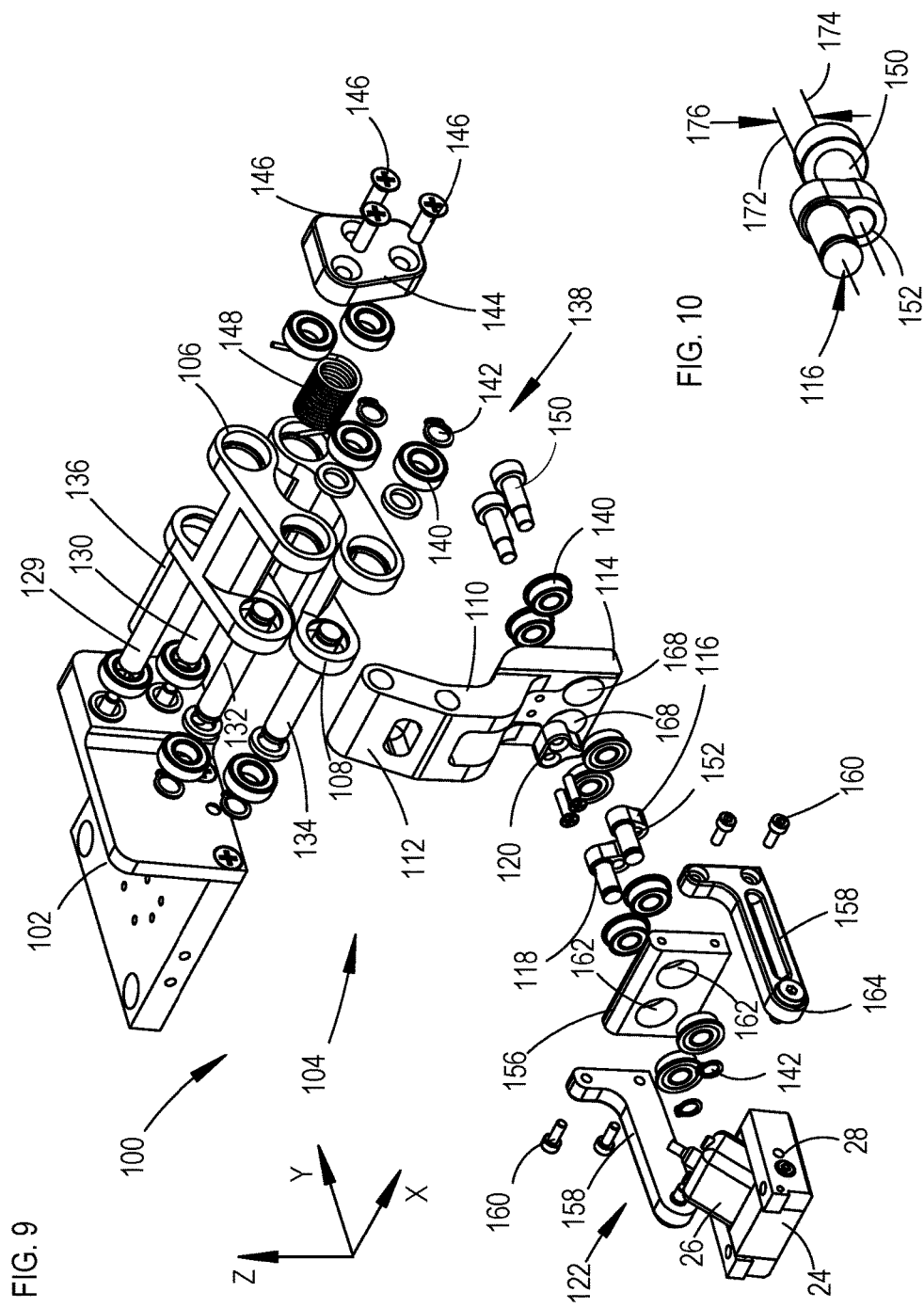

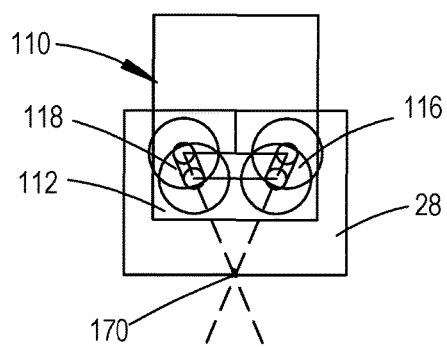
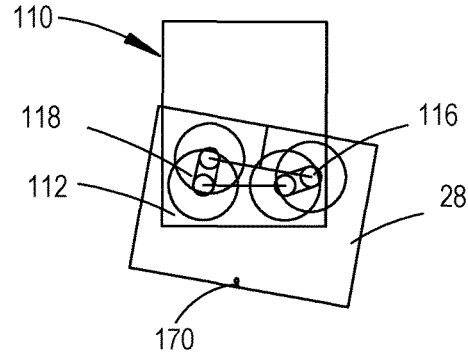
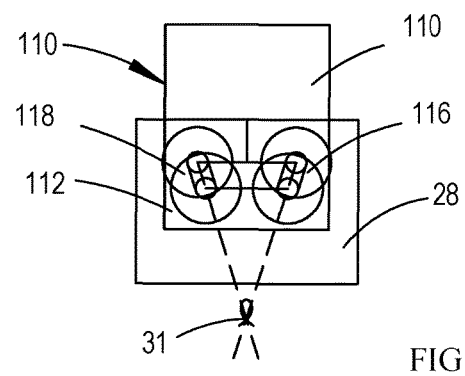
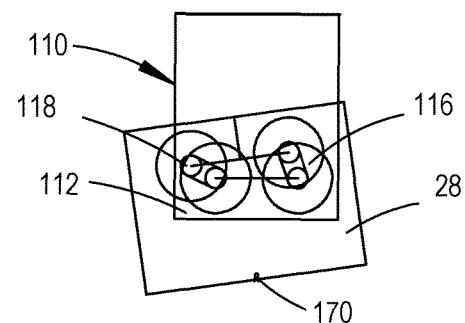
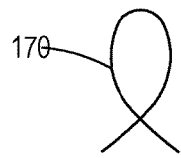

10.00

POSITION ERROR

TIPPING MOMENT
TRANSLATION FORCE
(Z-COMPONENT)
REACTION FORCE
Y-COMPONENT

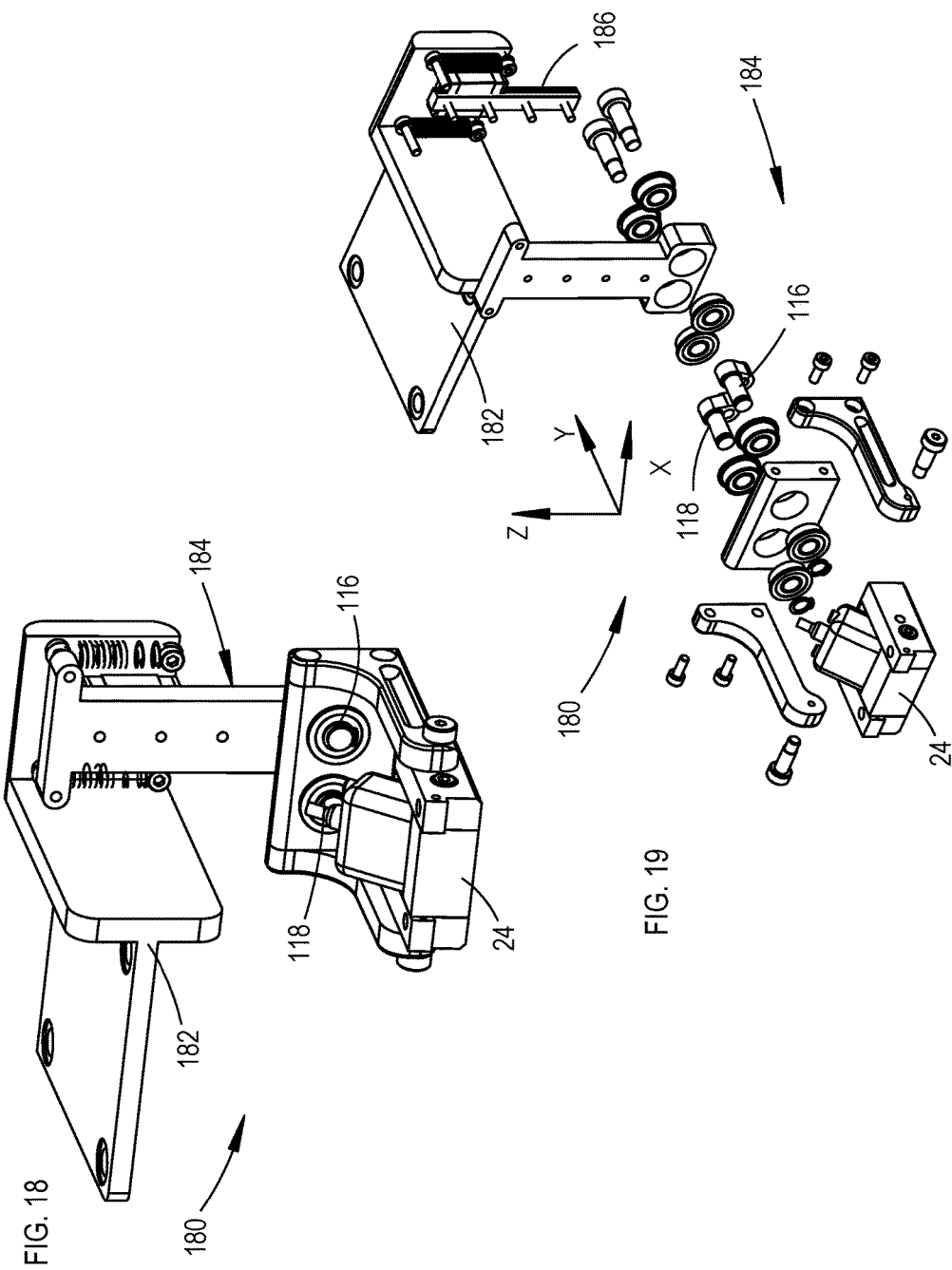

US 10,072,745 B1

STRAIGHT LINE MECHANISM WITH ANTI-TIP FEATURES

CROSS-REFERENCE TO RELATED APPLICATIONS

The present application is a conversion to a regular utility application of U.S. Provisional Patent Application Ser. No. 62/245,983, filed Oct. 23, 2015, and invented by Harvey Alan Dorsey.

TECHNICAL FIELD OF THE INVENTION

The present invention relates in general to mechanical straight line mechanisms, and in particular to mechanical straight line mechanisms for constraining movement of a probe sensor across a surface being inspected.

BACKGROUND OF THE INVENTION

In several industrial processing or inspection applications a need arises for a mechanism, shoe, or probe that will maintain flat, intimate contact with a variable surface while being positioned over the surface with a gantry type mechanism generally consisting of two axes of translational positioning (X,Y), as with the raster type scanner probe. It is desired to constrain the scanner probe to move upward from the surface in a direction perpendicular to the surface, along a Z-axis.

SUMMARY OF THE INVENTION

A novel straight line mechanism for a swing arm is disclosed having a four bar linkage with two rotation pins fixed and two rotation pins floating. A link extends through the two floating pins and downward beneath the floating pins to define a swing arm. A yoke is mounted in cantilevered arrangement from a lower end of the swing arm by means of two spaced apart offset pins, with the mounting spacing thereof being closely spaced and at a lower elevation at the swing arm than at the yoke, preferably with a longitudinal axis of the yoke being disposed transverse to a longitudinal axis of the swing arm. The two spaced apart offset pins provide for constrained rotation about a Y-axis, when traveling in the X-axis direction of travel, and prevent tipping of a sensor probe. The offset pins are preferably configured such that the center of rotation for the probe is at the bottom of the probe. The sensor probe is pivotally mounted in an end of the yoke disposed opposite of the swing arm, free to rotate in an angular direction about an X-axis disposed transverse to a direction of travel along a Y axis. Movement of the sensor probe is constrained by the straight line mechanism to travel along the Z-axis, which is preferably perpendicular to a surface that the probe is traveling across.

DESCRIPTION OF THE DRAWINGS

For a more complete understanding of the present invention and the advantages thereof, reference is now made to the following description taken in conjunction with the accompanying Drawings in which FIGS. 1 through 18 show various aspects for straight line mechanism for a swing arm device made according to the present disclosure, as set forth below.

FIG. 1 is a perspective view of a carriage for a mechanical straight line mechanism for constraining movement of a probe sensor across a surface being inspected;

FIG. 2 is a perspective view of a probe assembly for mounting to the straight line mechanism of FIG. 1;

FIG. 3 is a perspective view of a probe mounting bracket having a prior art straight line mechanism;

FIG. 4 is a perspective view of a second probe mounting bracket having a prior art Z-axis mechanism;

FIG. 5 is a perspective view of a third probe mounting bracket having a third prior art straight line mechanism;

FIG. 6 is a conceptual line drawing corresponding to the probe mounting bracket of FIG. 5, and depicts operation of the corresponding prior art straight line mechanism.

FIG. 7 a conceptual line drawing depicting operation of the probe mounting bracket of FIG. 8;

FIG. 8 is a perspective view of a new probe mounting bracket having a straight line mechanism made according to the present disclosure;

FIG. 9 is an exploded, perspective view of the probe mounting bracket of FIG. 8;

FIG. 10 is a perspective view of one of the offset pins shown in FIGS. 8 and 9;

FIGS. 11-15 are conceptual line drawings depicting operation of the dual offset pins of the straight line mechanism of the present disclosure;

FIGS. 16 and 17 are conceptual line drawings which depict tipping of a sensor probe; and FIG. 18 is a perspective view and FIG. 19 is an exploded perspective view of a probe mounting bracket having a straight line mechanism with anti-tip features of the present disclosure.

DETAILED DESCRIPTION OF THE INVENTION

Figure 1:
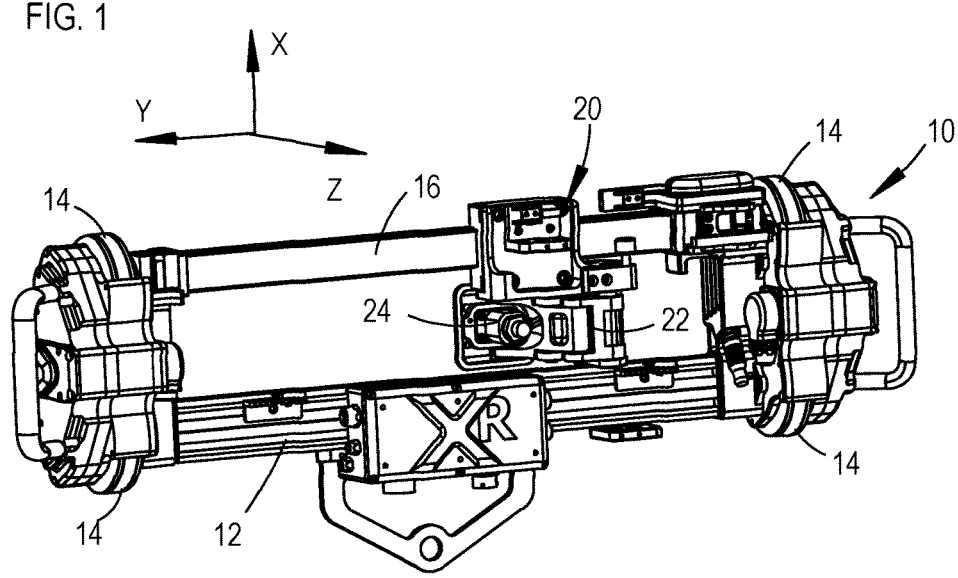

FIG. 1 is a perspective view of a carriage 10 for moving along a surface of a structure and measuring properties of a material forming the structure, such as, for example, for inspection of industrial metal chemical storage tanks such as may be found in chemical plants or on fuel storage tank farms. The carriage 10 has a frame 12, four wheels 14 and a rail 16. The wheels 14 will roll across a surface being measured. A probe mounting bracket 20 is slidably mounted to the rail for moving from side to side on the carriage 10 as the carriage 10 moves across the measured surface. The probe mounting bracket 20 includes a straight line mechanism 22 to which a probe assembly 24 is mounted.

Figure 2:
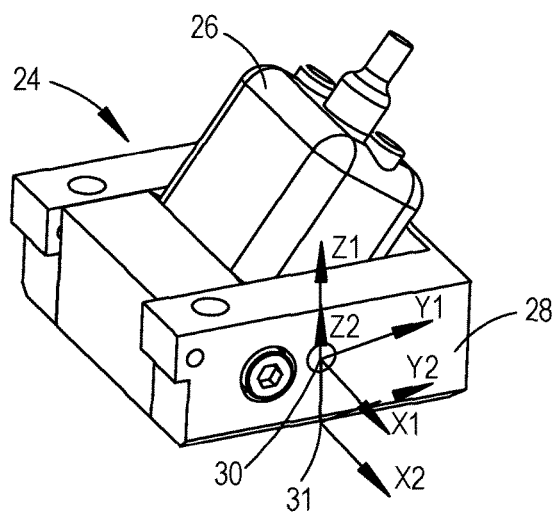

FIG. 2 is a perspective view of the probe assembly 24 which is mounted to the straight line mechanism 22 of the mounting bracket 20. The probe assembly includes a sensor probe 26 and a housing which defines a shoe 28 for the sensor probe 26. The sensor probe 26 may be of various types for taking measurements of surfaces, such as an ultrasonic transducer, an electromagnetic transducer, or an optical transducer for emitting a measurement signal and receiving a return signal from the measurement signal which is affected by material of the surface being measured.

The mechanism, shoe, or sensor probe will maintain flat, intimate contact with a variable surface while being positioned over the surface with a gantry type mechanism generally consisting of two axes of translational positioning (X,Y), as with the raster type scanner in FIG. 1. In this portable type of scanning mechanism, the drive wheels are utilized to move along the surface under test as well as the linear guide between the set of wheels on either side to provide the X- and Y-axis movements. For the probe itself, this generally requires compliance in three degrees of freedom, as shown in FIG. 2. The shoe assembly in this diagram is a shear wave, or angle beam, transducer used for industrial ultrasound inspection. The translational compliance (Z-axis) should be constrained to a straight line and be perpendicular to the plane of reference of the positioning mechanism that will move the probe orthogonally across the surface. The two rotational axis ($\alpha$ and $\beta$) of compliance will be degrees of freedom about the two perpendicular lines which are parallel to the X- and Y-axis, and should ideally pass through the vertical centerline of the shoe. These two degrees of freedom, as well as the one degree of freedom normal to the positioning plane, will allow the shoe to maintain flat contact with a surface that may vary from being absolutely parallel to the plane of the positioning mechanism. When the positioning mechanism is designed for a tubular object, the translational axis will ideally cross through the longitudinal axis of the tube or pipe (toward the centerline) and extend in a radial direction. The shoe mechanism will also require a mechanism such as a spring to maintain a force pressing the shoe against the surface being inspected. In the prior art, the probe axis of rotation 30 is located in a centerline 28, typically constrained to be at a height above bottom of the probe 28 due to the size of bearings mounting the probe 28. Ideally, the axis of the probe sensor 26 will lie directly on the bottom of the probe 28 at the point 31 shown in FIG. 2. Real space constraints for the mechanical joint, however, typically place the axis higher up on the shoe assembly as in FIG. 2, at the point 30. For positioning accuracy, where the position measuring devices are generally contained in the larger X-Y positioning mechanism, the joints and components of the shoe compliance mechanism should be as rigid as possible. It is also necessary for proper compliance at reasonable spring pressures for the friction to be sufficiently low in all three degrees of freedom.

Figure 3:
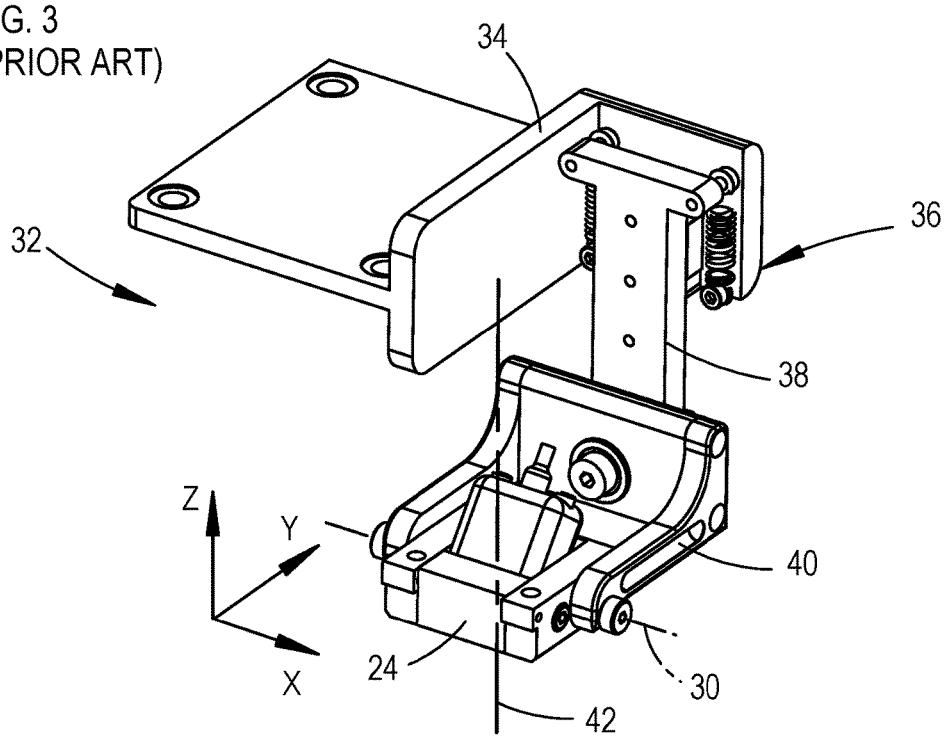

FIG. 3 is a perspective view of a probe mounting bracket 32 having a carriage mount 34 and a prior art straight line mechanism 36. The carriage mount 34 secures the straight line mechanism 36 to the rail 16 of the carriage 10 for selectively moving along the rail 16. The straight line mechanism 36 has a linear slide assembly 38 and a yoke 40 pivotally mounted to a lower end of the linear slide assembly 38. The yoke 40 extends orthogonal to a longitudinal axis of the linear slide assembly 38. A probe assembly 24 is pivotally mounted to the outward end of the yoke 40, and pivots about the axis 30. The straight line mechanism 36 attempts to constrain the probe assembly 24 to move along the straight line 42, which extend parallel to the Z-axis and orthogonal to the surface being measured.

Figure 4:
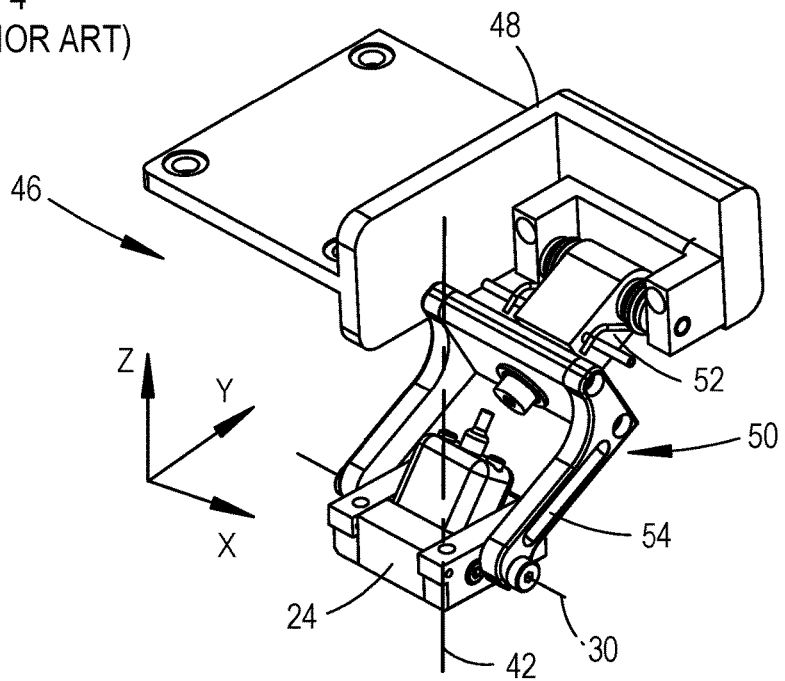

FIG. 4 is a perspective view of a probe mounting bracket 46 having a carriage mount 48 and a prior art Z-axis mounting mechanism 50. The carriage mount 48 secures the Z-axis mechanism 50 to the rail 16 of the carriage 10 for selectively moving along the rail 16. The Z-axis mechanism 50 has a pivot arm 52 pivotally mounted to the carriage mount 48 for rotating about an axis parallel to an X-axis, and a yoke 54 pivotally mounted to the pivot arm 55 for rotating about an axis parallel to a Y-axis, which extend in the direction of movement of the probe assembly 24 over a surface being measured. A probe assembly 24 is pivotally mounted to the outward end of the yoke 54 for rotating about the axis 30 which extends parallel to an X-axis. The Z-axis mechanism 50 attempts to constrain the probe assembly 24 to move along the straight line 42, which extend parallel to the Z-axis and orthogonal to the surface being measured.

For the two rotational degrees of freedom, prior art consists of several types of common rotational joints, usually having a "yoke" type mechanism rotating on one axis with the other passing through a line through the ends of the yoke. (See FIGS. 3 and 4). For the vertical translation, there are two common methods. The first method consists of a linear guide, of which three types are most common. One of these consists of two vertical round shafts with linear bearings. The bearings may be of plain bearing type or the re-circulating ball type. The second type consists of commercially available linear guide modules having a carriage and a hardened linear rail with grooves for guidance of a set of ball bearings which re-circulate in a pathway inside the carriage, as in FIG. 3. A third type utilizes some type of rail, preferably with hardened edges, with some type of radial bearings having a mating outer circumference that allows constraint between the outer surface of the bearing and the rail geometry. There are essentially three disadvantages to these types of linear guides. For the first, the reaction forces from the movement along the two translational X-axis and Y-axis guided by the positional mechanism are parallel to those axes. Any vertical translation required to maintain contact where the surface may vary from the previous distance in the Z component must be a result of the X- or Y-axis reaction force and the spring, which constrains the shoe to the surface. With the required movement in the Z direction being perpendicular to the reaction force (X- or Y-component) causing the movement, the efficiency of the translation of the force is at the minimum. As a result, the Z-axis translational joint must exhibit very low friction. A second disadvantage results in the necessarily open linear race of a linear bearing arrangement. This makes the Z-translational joint very susceptible to problems from environmental effects and debris interference in the bearing. A third disadvantage arises from the large X- and Y-force components as translated to the contact point of the bearings in the linear guide. These resultant components arise from the large X- and Y-components at the surface that are required to cause the Z-axis translation through a very low efficiency factor. Furthermore, the required separation of the two X- and Y-axis planes, one at the surface and one at the contact point of the Z-axis bearing, results in large moment forces. This results in high moment load capacity requirements for the linear guide, which is usually better suited for direct translation loads. Since the contact point of the shoe is usually offset from the bearing contact points of the linear guide travel, the combination of X- and Y-movements in the positional plane results in considerable moment forces about all three axes. The linear guide generally has only significant moment load rating for one or two preferential directions. The size constraints of the required standard re-circulating ball linear guide usually prevents the selection of a guide with the sufficient load capacity. This, along with the environmental issues, often results in failure of the guide. Many of the same issues exist for the arrangement containing radial bearings with profiled outer race constrained on the two linear profile edges. With the latter, the circular nature of the radial bearings allows better sealing from environmental contaminates and utilizing the outer race diameter for rolling on the track results in a larger rolling element. However, debris on the track can still be a problem, and radial bearings have much lower ratings for the thrust loads resulting from the moment loads in one of the translational directions. Lastly, these configurations generally do not have the precision and rigidity of the commercial re-circulating ball linear guides, which are usually precision ground. For the type of linear guide consisting of the cylindrical rods and cylindrical linear bearings, the point contact of the ball rolling elements on the cylindrical shaft results in low load ratings. For the plane bearing types, friction is too high for this low efficiency force transfer and the associated high moment loads.

The second method for vertical translation shown in FIG. 4 utilizes some type of rotational arm, which may extend in either the X- or Y-axis direction, in which the vertical component of the rotation allows the vertical compliance of the shoe. One advantage of this configuration is that the transfer of force and resulting vertical translation is of higher efficiency. Mechanical advantage lessens the sensitivity to friction in the upper rotary joint, and the high moment forces actually translate well to the resulting rotation of the upper rotary joint. A second advantage results from the rotary joint being less susceptible to environmental contaminates since cylindrical bearings are more easily shielded. The disadvantage of this method is that the vertical travel is along an arc rather than precisely vertical in the Z-axis. The resulting translational component of movement along either the X-axis or Y-axis, depending on the axis upon which the rotary joint is aligned, will result in a positional error from the known location and position of the X- and Y-axis of the positioning system. This positional error can be minimized by designing the "swing arm" of the rotational member to operate as close to parallel with the X/Y plane as possible. This will maximize the Z-axis component and minimize the horizontal component per degree of travel. However, for significant vertical travel requirements, the horizontal position error will increase with the extent of vertical compliance. A second limitation occurs as free end of the swing arm travels down from the horizontal plane containing the upper rotary joint axis when the shoe is traveling in the direction where it leads the upper rotational joint. As the angle from horizontal of the swing arm increases, so does the resistance to a resultant upward vertical movement since the efficiency of this force translation from the X-axis to the resultant motion in the Z-axis becomes much lower. This is exacerbated by the fact that the resulting movement of the shoe, relative to the scanning bridge, has a component of displacement in the same direction as the shoe travel relative to the surface. This situation can cause a jamming effect, especially when encountering any sharp vertical edges on the surface. When the shoe is traveling in the other direction, where the upper rotational joint leads the shoe, the moment forces are much more advantageous in producing the upward vertical translation resulting from the contact force as the shoe travels over a raised area of the surface. The X-axis component of the error displacement in this case is in the opposite direction from the shoe travel, assisting the shoe in swinging up and away from any upward surface deviations.

Some compromises are encountered regarding the yoke mechanism. For the first, there is a small inherent position error regarding the center of the probe position relative to the base X/Y plane as the probe shoe rotates about a point above the face of the shoe, as in FIG. 15. Secondly, a tipping moment is encountered as the shoe translates in along the X-axis. This tipping moment gets larger as the ratio of Z component to X component gets larger, as in FIG. 16. The need for low friction bearings and sufficient material strength will require a significant clearance in the Z axis, and this presents a challenge when smaller X dimensions are required for smaller probe shoes.

Figure 5:
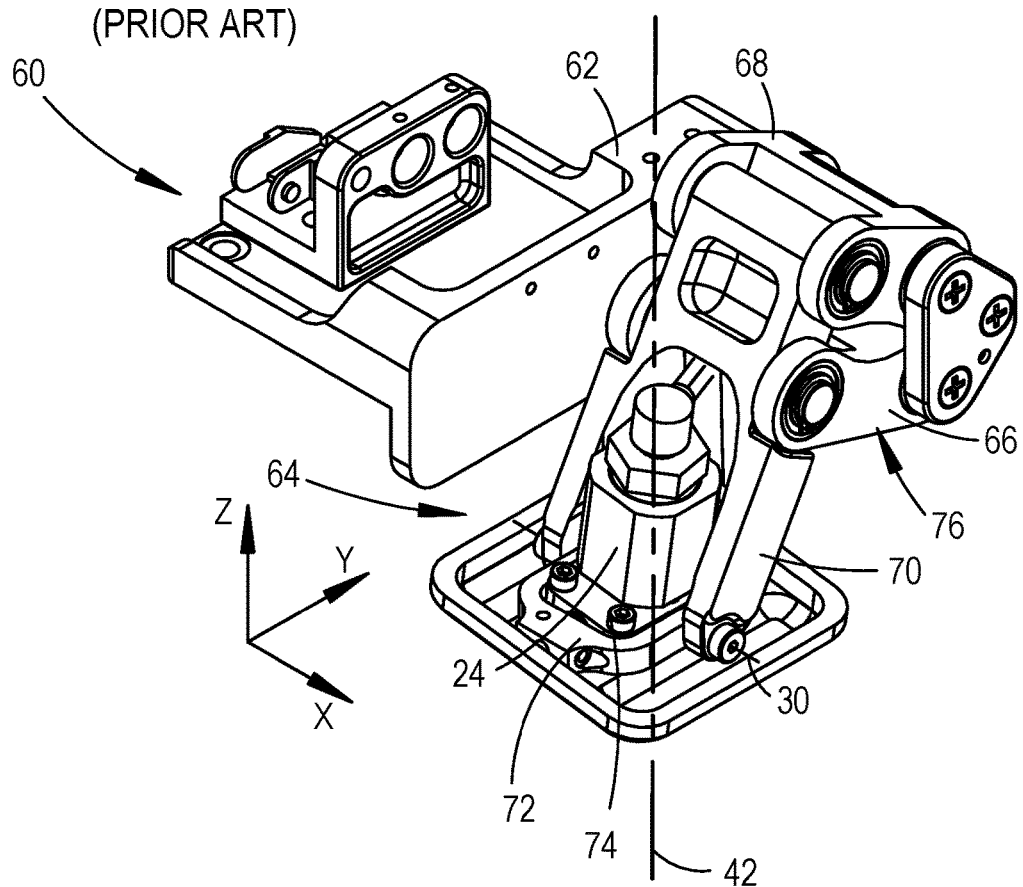

FIG. 5 is a perspective view of a probe mounting bracket 60 having a carriage mount 62 and a prior art straight line mechanism 64. The carriage mount 62 secures the straight line mechanism 64 to the rail 16 of the carriage 10 for selectively moving along the rail 16. The straight line mechanism 64 includes a four bar linkage 76 having a lower link 66 and an upper link 68. Two pivot pins of the links 66 and 68 are fixed and do not move, and two pivot pins are free to move, or float. A split extension 70 extends through the two floating pivot pins and provides the swing arm. Two gimbals 72 and 74 are mounted to the opposite end of the split extension 70 from the pivot pins. The two gimbals 72 and 74 retain a probe assembly to move around two orthogonal axes of rotation. The straight line mechanism 64 attempts to constrain the probe assembly 24 to move along the straight line 42, which extend parallel to the Z-axis and orthogonal to the surface being measured. This mechanism utilizes advantage of rotary joints, such as resistance to debris and the transfer of forces through moments. Also, the arrangement allows the contact points of the bearings to be spread out closer to the edges of the mechanism. In the geometry of this design, forces along all three orthogonal axis transferred through the shoe resolve to moment loads on the upper assembly as with earlier designs, but those forces result in a radial component within the bearings as well as thrust loads. This eliminates pure thrust loads on bearings which are primarily rated for radial loads, and that radial component, relative to the thrust component, increases with the relative increase in the spacing of the bearings. The arm configuration consists of a four bar linkage. The linkage has been designed such that a line through the end of the linear extended bar, coincident with the rotational joint parallel to the Y-axis, approximates a straight line motion in the vertical Z-axis. Thus, the axis of rotation from both rotational joints and the Z-axis translational axis all converge at a single point which lies on a line passing through the floating pins of the mechanism. The degree of accuracy regarding the straightness of the vertical line depends on the locations of the two constrained shafts, the lengths of each bar between the joints, and the length of extension on the longer bar to the point on the axis of the shoe rotational joint parallel to the Y-axis.

Certain instances remain where the mechanism in FIG. 5 remains problematic. In that mechanism, the axis corresponding to the three degrees of freedom at the shoe are required to intersect at a common point, with the one axis constrained to the approximated straight vertical line derived by the mechanism. The other perpendicular two axes will pass through the midpoint of the shoe as seen from a plan view. A practical method for achieving this requires an element of the mechanism that surrounds the shoe at some point in a loop of some geometry such as the double gimbaled joint in FIG. 5. For size, strength, and rigidity purposes, the loop should completely surround the shoe. When implementing some devices for the surface following action, such as the angle beam transducer shown in FIG. 2, it is necessary to have the exit point of the sound very near to another feature, such as a weld or inside corner of material. The method in FIG. 5 makes this difficult. It is often preferable to utilize the yoke mechanism as seen in FIGS. 3 and 4, as to allow closer proximity of the shoe to an edge. This will further accommodate various yokes which allow for different deployed devices of various size and shape. For the mechanism in FIG. 5, a change in probe dimensions will in many cases require a completely new design of the four bar mechanism.

Figure 6:
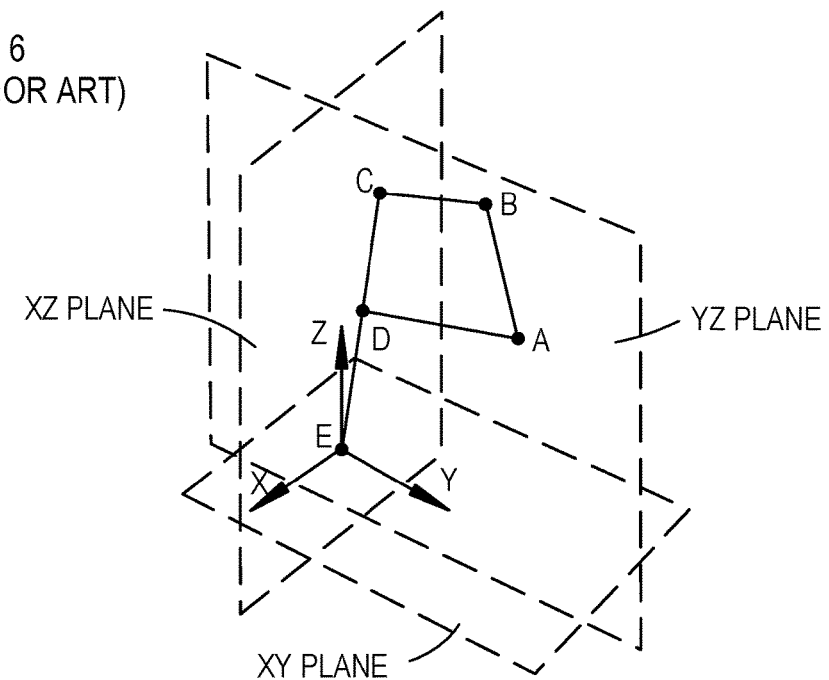

FIG. 6 is a conceptual line drawing corresponding to the probe mounting bracket 60 of FIG. 5, and depicts operation of the prior art straight line mechanisms and various linkages. The mounting bracket 60 attempts to constrain a point E to move along a straight line defined to extend parallel to a Z-axis. The invention consists of designs which minimize the problems encountered with the prior art. The developments are shown in FIG. 8. The new invention in FIG. 8 differs from the prior art in FIG. 5 as depicted in the FIGS. 6 and 7. As previously mentioned, the prior art in FIG. 5 is designed such that Point E will translate in a vertical path in the Z direction approximating a straight linear travel. However, the mechanism placed the rotational joints about the X-axis and Y-axis where the axis of each intersected with a linear link CDE (shown in FIG. 6). This places constraints on the type of joint mechanisms that could be utilized at this point as well as the size and shape of the probe deployed. Access to the far edge of the probe was also limited.

Figure 7:
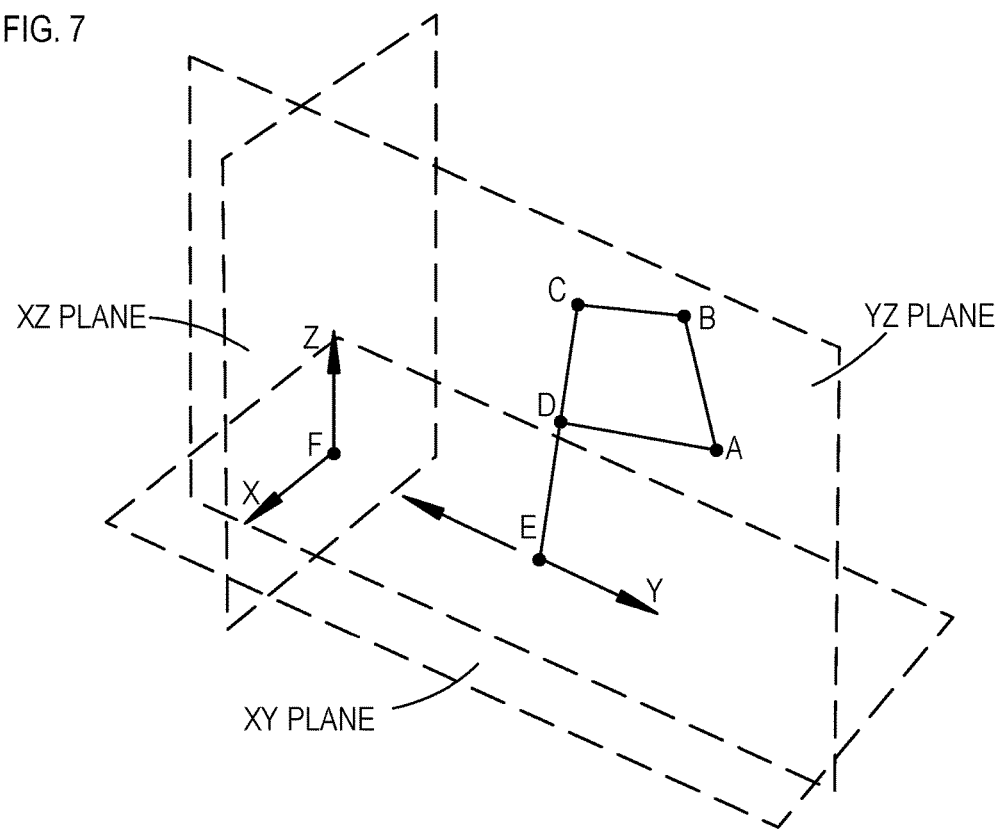

FIG. 7 discloses a new straight line mechanisms made according to the present disclosure, corresponding to the probe mounting bracket 100 of FIG. 8. The probe mounting bracket 100 has various linkages associated therewith to attempt to constrain a point F to move along a straight line defined to extend parallel to a Z-axis forward of the point E. The XY plane is moved forward of the point F. The mechanism in FIGS. 7 and 8 is designed such that the mechanism is optimized for vertical linear travel at point F, allowing the Y axis to be relocated outward from the link CDE, which is no longer constrained to being co-linear between segments CD and DE, and allowing a yoke mechanism to be utilized. This allows the edge of the probe to be unrestricted to access at the edge away from the mechanism, and offers flexibility in the size and shape of the yoke and probe used. It no longer requires re-design of the four link geometry for the various probes used. When utilizing a yoke configuration for the two rotational axis, it is desirable to maintain the X-axis joint significantly parallel to the X-Y plane. If the link CDE rotates significantly, the probe can be lifted above the surface under test to such a point where the link CDE near point E may contact the surface before the probe. In the invention, the design is optimized further to minimize rotation of the link CDE. Furthermore, the variables relevant to the accuracy of the straight vertical travel now include the sine of the angle of rotation of that link as this is now a factor in the distance from point E to the vertical line along Z. The invention includes this factor along with the previous variables in optimizing the straight line. The vertical line accuracy is now less dependent on the length of separation between the points between E and F for practical values, being more significantly dependent on the sine of the angle of rotation, which will remain constant with the design of the four link portion of the mechanism.

FIG. 8 is a perspective view of a new probe mounting bracket 100 made according to the present disclosure. The probe mounting bracket 100 has a carriage mount 102 and a straight line mechanism 104. The carriage mount 102 secures the straight line mechanism 104 to the rail 16 of the carriage 10 for selectively moving along the rail 16. The straight line mechanism 104 has a four bar linkage 138 with a lower link 106 and an upper link 108. The upper link 108 has an end with a fixed pin 128 and an opposite end with a free floating pin 132. The lower link has an end with a fixed pin 130 and an opposite end with a floating pin 134. The free ends of the links 106 and 108 are disposed adjacent to one another and the fixed ends of the links 108 are disposed adjacent to one another. The fixed pins 128 and 130 are fixed in relation to the carriage mount 102. A swing arm 110 is defined by a link from each of the links 106 and 108, with the swing arm 110 connected to the two floating pivot pins 132 and 134. The swing arm 110 has an upper end 112 which defines the link connected to the floating pivot pins 132 and 134, and a lower end 114. A brace pin 136 extends behind the fixed pins 128 and 130.

A yoke 122 is rotatably connected to the lower end 114 of the swing arm 110 by two offset pins 116 and 118 generally for rotation about an axis which extends parallel to a Y-axis. The two offset pins 116 and 118 constrain rotation of the yoke 122 relative to the swing arm 110, and additionally a rotation limiter 120 is disposed between the two offset pins 116 and 118 to further limit rotation of the yoke 122 relative to the swing arm 110. Mounting holes 168 (shown in FIG. 9) are formed into the swing arm 110 for pivotally securing first ends of respective ones of the offset pins 116 and 118. The mounting holes in 162 are formed into the yoke 122 for pivotally securing ends of respective ones of second ends of the offset pins 116 and 118. The mounting holes 168 in the swing arm 110 are preferably spaced apart at a narrower spacing and at a lower elevation than the mounting holes 162 (shown in FIG. 9) in the yoke 122 for pivotally securing second ends of the respective ones of the offset pins 116 and 118. Thus, the offset pins 116 and 118 are pivotally secured to the yoke 122 at a higher elevation and a wider spacing then they are pivotally secured to the swing arm 110. The offset pins 116 and 118 are preferably configured such that the axis for rotation of the shoe 28 about the Y-axis will be located at the bottom of the probe 26 and the shoe 28.

A probe assembly 24 is mounted to an end of the yoke 122 distally disposed from the lower end 114 of the swing arm 110 which extends along a Y-axis. The probe assembly 24 is free to rotate about an axis 126 which extends parallel to an X-axis. The straight line mechanism 104 attempts to constrain the probe assembly 24 to move along an axis which extends parallel to a Z-axis, which preferably extends transverse to and orthogonal to the surface being measured. Preferably, the X-axis, the Y-axis and the Z-axis are mutually orthogonal.

FIG. 9 is an exploded, perspective view of probe mounting bracket 100. The floating pins 132 and 134 and the fixed pins 128 and 130 are shown. The fixed pins 128 and 130 are fixed in relation to the carriage mount 102. Rotary bearings 140 and snap rings 142 are shown for securing pins 128, 130, 132 and 134 in the links 106 and 108 of the four bar linkage 138, and second ends of the offset pins 116 and 118 to the yoke 122. A fixed shaft support block 144 is secured to the four bar linkages 106 and 108 by threaded fasteners 146. A coil spring 148 biases the two links 106 and 108 into a downward position, closer to the surface being measured, pushing against the brace pin 136. Mounting pins 150 threadingly secure into respective ones of two offset pin halves 152 to provide respective ones of the two offset pins 116 and 118. The yoke 122 includes a block 156 having two spaced apart mounting holes 162 for receiving bearings 140, and two arms 158 which are fixedly secured to the block 156 by means of threaded fasteners 160. Two fasteners 164 rotatably secure the shoe 28 of the probe assembly 24 to the two arms 158. The two mounting holes 162 are spaced apart for registering with and receiving second ends of respective ones of the offset pins 116 and 118.

The swing arm 110 has the upper end 112 and the lower end 114. The lower end 114 has two mounting holes 168 which are spaced apart for registering with and receiving first ends of respective ones of the offset pins 116 and 118. Preferably the two mounting holes 168 in the swing arm 110 are spaced apart in a closer spacing than the two mounting holes 162 in the yoke 122, and disposed at a lower elevation than the two mounting holes 162.

FIG. 10 is a perspective view of one of the offset pins 116 and 118. Side elevation view of the offset pins 116 and 118 are preferably L-shaped. Mounting pins 150 threadingly secure into respective ones of two offset pin halves 152, resulting in two offset axes of rotation 172 and 174 for each of the offset pins 116 and 118, one defined relative to the swing arm 110 and another defined relative to the yoke 122. An offset length 176, or offset dimension, for each of the offset pins 116 and 118 is defined by the distance between the axes of rotation 172. Projection lines extending through the axes of rotation 172 and 174 for each of the offset pins 116 and 118 intersect to define an central axis of rotation 170 about the Y-axis, which is shown in FIG. 11.

FIGS. 11-15 disclose operation of the dual offset pins 116 and 118, as discussed below in more detail. In FIG. 11 the center of probe face is aligned with projected vertexes of rotation of the offset pins, at zero degrees rotation. The focus of the probe is at the probe face center. The arrangement of FIG. 11 is preferred, in which the offset pins 116 and 118 are configured with axes of rotation such that rotation of the probe shoe 28 (and thus the end of the probe sensor 26) will be around the axis 170 which is parallel to the Y-axis. Projection lines 172 and 174 drawn through the offset lengths, or offset dimensions, of the offset pins 116 and 118 will intersect at the axis 170, defining the center of rotation of the show 28 about the Y-axis. The axis 170 is preferably at the bottom of the shoe 28 as shown in FIG. 11. For very small rotational movements, the shoe 28 and yoke assembly 122 rotate substantially about that axis 170 with high precision. The mechanics of this arrangement are also substantially conducive to overcoming the tipping moment, and the reaction of the shoe in being pushed away from a point of obstruction or elevated surface protrusion will raise the edge of the shoe at that point. This will assist the shoe in ramping up and over the protrusion.

FIGS. 12 and 13 show the shoe 28 rotating as constrained by the offset pins 116 and 118. The axis 170 about which the bottom of the shoe 28 rotates will follow a path 178, shown in FIG. 14. FIG. 14 shows the path 178 that the axis 170 at the bottom of the show 28 follows in rotation constrained by the offset pins 116 and 118. The path 178 is shown in FIGS. 11, 12 and 14, but is almost imperceptible in these Figures.

In FIGS. 11-14 the center of the probe face above the protected vertexes of offset lines. With further rotational movements, the path of the marker deviates from the pseudo rotational point and moves in the path displayed in FIG. 14. In the arrangement of FIG. 11, the two lines passing through the offset dimensions of the shafts in the offset arrangement are made to converge at the desired point of rotation. For very small rotational movements, the show 28 and yoke assembly 122 rotate substantially about that point with high precision. The mechanics of this arrangement are also substantially conducive to overcoming the tipping moment, and the reaction of the shoe in being pushed away from a point of obstruction or elevated surface protrusion will raise the edge of the shoe at that point. This will assist the shoe in ramping up and over the protrusion. With further rotational movements, the path of the marker deviates from the pseudo rotational point and moves in the path displayed in FIG. 14. As well as providing the desired reluctance to tipping, the error is also reduced over the practical range of the mechanism, which is typically +/−10 degrees. In practice, this is a sufficient range to compensate for any differences in the orientation of the scanning bridge and deviations in the surface. In both FIGS. 12 and 13, the shoe is rotated 8 degrees.

In FIG. 15 the center face of probe 26 and the show 28 are aligned with projected vertexes of rotation of the offset pins, at zero degrees rotation, with the focus of axis 170 being located beneath the shoe 28 as shown in FIG. 15. The path 178 will be larger in FIG. 15 than the path 178 shown in FIGS. 11-13, with the longer lengths of the projection lines from the offset lengths 176. A modification in the shaft placements resulting in the convergence of the lines at a point below the marker at the zero degree rotation point, as shown in FIG. 15, results in the marker path shown in FIG. 15.

Figure 16:
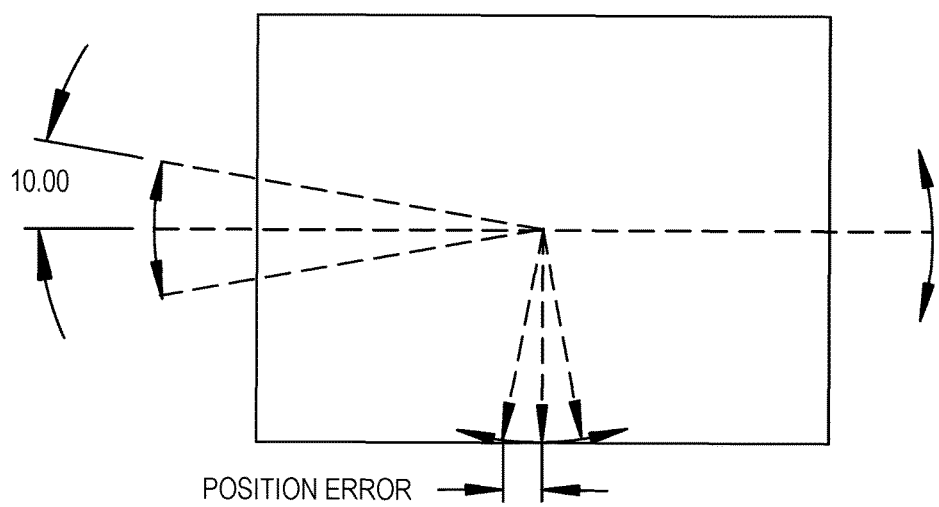
Figure 17:
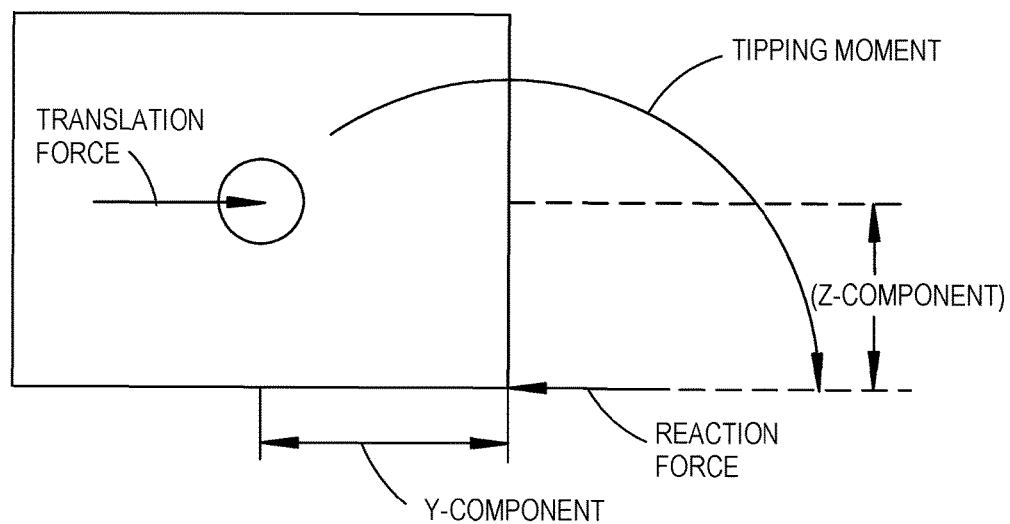

FIGS. 16 and 17 disclose tipping of the sensor probe 24. The invention further seeks to reduce the positional error and tipping moment shown in FIGS. 15 and 16 with a new configuration for the rotational joint along the Y-axis. In FIGS. 3 and 4, the typical single shaft and bearing type of arrangement which allows rotational compliance around the Y-Axis as shown in FIGS. 2, 6, and 7 is replaced by two sets of shafts and bearings. Bearings are utilized in both the Yoke and the Swing arm, or other vertical translating component, as opposed to the prior art where the shaft can be constrained in one or the other. Whereas two continuous linear shafts would constrain this axis, the two shafts are replaced with offset shafts, such as in a typical crank mechanism. The ends of the offset shafts are constrained into the Yoke and Swing Arm, respectively, typically using bearings for low friction and wear. As can be seen in FIG. 9, the reactive force on the shoe requires the bearings on the Yoke to be at the higher position. FIGS. 11-15 demonstrate the bearing placement and separation. The upper bearings, on the Yoke, are placed with a wider spacing than the lower bearings on the Swing Arm. If the rotational axis of a single pivot could be placed at the marker on the bottom center of the shoe, the shoe mechanism would rotate around that point, which would reduce the error of FIG. 16 to zero as well as the tipping moment in FIG. 17. The mechanical constraints of components of finite size preclude this possibility. The reactive motion of the marker point away from the surface protrusion in the FIG. 16 mechanism further assists the desired tipping reluctance.

FIG. 18 is a perspective view and FIG. 19 is an exploded perspective view of a probe mounting bracket 180 having a carriage mount 182 and a straight line mechanism 184. The carriage mount 182 secures the straight line mechanism 184 to the rail 16 of the carriage 10 for selectively moving along the rail 16. The straight line mechanism 184 includes two spaced apart, offset pins 116 and 118 to provide an anti-tip mechanism with a linear slide 186 straight line mechanism. The dual offset pins 116 and 118 constrains rotation of a probe sensor about a Y-axis to prevent tipping of the probe sensor, while allowing movement of the probe sensor over surface non-conformities.

The present disclosure provides advantages of a straight line mechanism having a yoke transversely extending from a swing arm, the end thereof constrained to move along a Z-axis extending transverse, preferably orthogonal, to a surface across which the yoke is moving. The present disclosure further provides an offset pin arrangement connecting between a swing arm and a probe sensor yoke which provides rotation about a Y-axis and preventing tipping of a probe sensor.

Although the preferred embodiment has been described in detail, it should be understood that various changes, substitutions and alterations can be made therein without departing from the spirit and scope of the invention as defined by the appended claims.

What is claimed is:

1. A straight line mechanism with anti-tip features, comprising: a four bar linkage with two rotation pins fixed and two rotation pins floating; a link extending through the two floating pins and downward beneath the floating pins to define a swing arm; a yoke is mounted in cantilevered arrangement from a lower end of the swing arm by means of two spaced apart offset pins, with a swing arm mounting spacing for the two spaced apart offset pins being more closely spaced and at a lower elevation at said swing arm than a yoke mounting spacing for the two spaced apart offset pins at said yoke, with a longitudinal axis of said yoke being disposed transverse to a longitudinal axis of said swing arm; and a probe pivotally mounted in an end of said yoke disposed opposite of said swing arm, wherein said probe is free to rotate in an angular direction about an X-axis disposed transverse to a direction of travel along a Y-axis, wherein movement of said probe is constrained by said straight line mechanism to travel along the Z-axis, which is perpendicular to a surface said probe is traveling across.

2. The straight line mechanism with anti-tip features according to claim 1, wherein a plane is defined by the axes X and Z which is perpendicular to the direction of travel for said probe and the Y-axis, said probe travels in said plane and said plain is substantially perpendicular to the surface being measured, wherein said X-Z plane is disposed forward of a projected point aligned with said floating pins.

3. The straight line mechanism with anti-tip features according to claim 2, wherein said X and Z plane are spaced apart from and disposed forward of a projection from said floating pins.

4. The straight line mechanism with anti-tip features according to claim 1, wherein said X and Z plane are spaced apart from and disposed forward of a projection from said floating pins.

5. The straight line mechanism with anti-tip features according to claim 1, wherein each of said offset pins has two axes of rotation, one defined relative to said swing arm and another defined relative to said yoke, and an offset length is defined by the distance between said two axes of rotation;

wherein projection lines extending through said axes of rotation for each of said offset pins intersect to define an central axis of rotation about the Y-axis, and wherein said central axis of rotation is disposed at a lower end of said probe.

\* \* \* \* \*